(12) United States Patent
Zhang et al.

(10) Patent No.: US 10,860,039 B2
(45) Date of Patent: Dec. 8, 2020

(54) OBSTACLE AVOIDANCE METHOD AND APPARATUS AND UNMANNED AERIAL VEHICLE

(71) Applicant: AUTEL ROBOTICS CO., LTD., Guangdong (CN)

(72) Inventors: Ke Zhang, Guangdong (CN); Bo Zang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 330 days.

(21) Appl. No.: 15/885,041

(22) Filed: Jan. 31, 2018

(65) Prior Publication Data

US 2019/0187725 A1 Jun. 20, 2019

Related U.S. Application Data

(63) Continuation of application No. PCT/CN2017/116572, filed on Dec. 15, 2017.

(51) Int. Cl.
  *G05D 1/00* (2006.01)
  *G05D 1/10* (2006.01)
  (Continued)

(52) U.S. Cl.
  CPC ........... *G05D 1/102* (2013.01); *B64C 39/024* (2013.01); *G06K 9/00664* (2013.01); *G06T 7/74* (2017.01);
  (Continued)

(58) Field of Classification Search
  CPC ...... G05D 1/102; G05D 1/101; H04N 13/239; H04N 13/296; H04N 5/23296;
  (Continued)

(56) References Cited

U.S. PATENT DOCUMENTS 6,130,705 A * 10/2000 Lareau ..................... G01C 3/08
                                                      348/144
2008/0189036 A1* 8/2008 Elgersma ............... G05D 1/101
                                                      382/153
(Continued)

FOREIGN PATENT DOCUMENTS

CN       105025219 A      11/2015
CN       106290246 A       1/2017
(Continued)

OTHER PUBLICATIONS

The International Search Report dated Aug. 30, 2018; PCT/CN2017/116572.

*Primary Examiner* — Shardul D Patel (57) ABSTRACT

The present disclosure discloses an obstacle avoidance method and apparatus and an unmanned aerial vehicle. The method includes: obtaining detection images of at least two different focal lengths from a camera apparatus; determining, according to the detection images of the at least two different focal lengths, that an obstacle exists in a detection area; and obtaining position information of the obstacle according to the detection images of the at least two different focal lengths. Because the camera apparatus performs a zooming operation quickly, it's no need to precisely obtain position and attitude information by using a Global Positioning System (GPS) and an onboard inertial device, which avoids measurement interference and a positioning error caused by the inertial device, thereby improves calculation precision.

11 Claims, 6 Drawing Sheets

(51) Int. Cl.
  *H04N 13/296* (2018.01)
  *H04N 13/239* (2018.01)
  *G06T 7/73* (2017.01)
  *B64C 39/02* (2006.01)
  *G06K 9/00* (2006.01)
  *H04N 5/232* (2006.01)
  *H04N 13/00* (2018.01)

(52) U.S. Cl.
  CPC ..... *H04N 5/23229* (2013.01); *H04N 5/23296* (2013.01); *H04N 13/239* (2018.05); *H04N 13/296* (2018.05); *B64C 2201/024* (2013.01); *B64C 2201/141* (2013.01); *G06T 2207/10032* (2013.01); *G06T 2207/30261* (2013.01); *H04N 2013/0081* (2013.01)

(58) Field of Classification Search
  CPC ....... H04N 5/23229; H04N 2013/0081; G06K 9/00664; G06K 9/0063; B64C 39/024; B64C 2201/141; B64C 2201/024; B64C 2201/127; G06T 7/74; G06T 2207/30261; G06T 2207/10032

USPC .......................................................... 701/4
See application file for complete search history.

(56) References Cited

U.S. PATENT DOCUMENTS

| | | | | |
|---|---|---|---|---|
| 2012/0147150 A1* | 6/2012 | Kojima | ............... | G01C 3/085 |
| | | | | 348/50 |
| 2014/0039730 A1* | 2/2014 | Loubiere | ............... | B60R 99/00 |
| | | | | 701/3 |
| 2016/0313736 A1* | 10/2016 | Schultz | ............... | G08G 5/0039 |
| 2017/0336806 A1* | 11/2017 | Blanc-Paques | ........ | G08G 5/045 |

FOREIGN PATENT DOCUMENTS

| CN | 107036579 A | * | 8/2017 |
|---|---|---|---|
| CN | 107036579 A | | 8/2017 |

* cited by examiner

OBSTACLE AVOIDANCE METHOD AND APPARATUS AND UNMANNED AERIAL VEHICLE

CROSS REFERENCE

This application is a continuation of International Application No. PCT/CN2017/116572, filed on Dec. 15, 2017, the disclosure of which is hereby incorporated by reference in its entirety.

TECHNICAL FIELD

The present invention relates to the field of unmanned aircraft technologies, and in particular, to an obstacle avoidance method and apparatus and an unmanned aerial vehicle.

RELATED ART

During, autonomous return or an autonomous flight of an unmanned aerial vehicle, obstacle detection needs to be performed by using visual information. The obstacle detection may be roughly classified into: remote detection based on monocular stereoscopic vision and proximity detection based on binocular stereoscopic vision. A detection range of the proximity detection based on binocular stereoscopic vision is determined by the baseline length of left and right view images which limits the detection range. Therefore, when performing remote obstacle detection, the monocular stereoscopic vision principle is usually adopted. Photographing is performed at different positions according to a left camera (or a right camera, a monocular is used for a general designation for the left camera and right camera below) in a front-view binocular camera, to obtain scene images at different viewing angles, thereby obtaining depth information of a point by using a pixel position difference that is obtained by matching the same point in the images of the different viewing angles.

However, in the foregoing detection process, position and attitude information of an airplane need to be precisely obtained by using a Global Positioning System (GPS) and an onboard inertial device. Calculation precision of depth information is directly affected by calculating data of the foregoing instruments. Consequently, due to accumulated errors of the onboard inertial device and imprecise positioning during a flight, an image calculating result is often unreliable.

SUMMARY

An objective of embodiments of the present invention is to provide an obstacle avoidance method and apparatus and an unmanned aerial vehicle, to avoid measurement interference and a positioning error caused by an onboard inertial device during obstacle detection, thereby achieving high calculation precision.

According to a first aspect, an embodiment of the present invention provides an obstacle avoidance method, used for an unmanned aerial vehicle. The unmanned aerial vehicle includes a camera apparatus. The camera apparatus supports optical zoom. The method includes:

obtaining detection images of at least two different focal lengths from the camera apparatus;

determining, according to the detection images of the at least two different focal lengths, that an obstacle exists in a detection area; and obtaining position information of the obstacle according to the detection images of the at least two different focal lengths.

In an embodiment of the present invention, the position information includes a distance S between the obstacle and the unmanned aerial vehicle and a height difference H between the obstacle and the unmanned aerial vehicle; and the obtaining position information of the obstacle according to the detection images of the at least two different focal lengths includes:

calculating the distance S between the obstacle and the unmanned aerial vehicle and the height difference H between the obstacle and the unmanned aerial vehicle:

$$S = \frac{(f1f2(h2-h1) + h1h2(f1-f2)\tan\theta)}{(f2h1 - f1h2)}$$

$$H = \frac{h1h2(f2-f1)}{(f2h1 - f1h2)\cos\theta}$$

where $\theta$ is an angle between a flight direction of the unmanned aerial vehicle and a horizontal direction, f1 is a distance between an image plane and an optical center when the camera apparatus is at a first focal length, h1 is an imaging height of the obstacle above the center line of the image plane when the camera apparatus is at the first focal length, f2 is a distance between the image plane and the optical center when the camera apparatus is at a second focal length and h2 is an imaging height of the obstacle above the center line of the image plane when the camera apparatus is at the second focal length, where $0° \leq \theta < 90°$.

In an embodiment of the present invention, the method further includes:

adjusting a velocity direction of the unmanned aerial vehicle according to the position information of the obstacle, to avoid the obstacle.

In an embodiment of the present invention, the adjusting a velocity direction of the unmanned aerial vehicle according to the position information of the obstacle includes:

adjusting the velocity direction of the unmanned aerial vehicle upward by a deflection angle A, the deflection angle A being:

$$A = \arctan\left[\frac{\lambda h1h2(f2-f1)}{f1f2(h2-h1)\cos\theta + (f1-f2)h1h2\sin\theta}\right]$$

where $\lambda$ is a safety factor.

In an embodiment of the present invention, the method further includes:

adjusting the camera apparatus to face the detection area.

In an embodiment of the present invention, the adjusting the camera apparatus to face the detection area includes:

adjusting a visual axis of the camera apparatus to be aligned with the flight direction of the unmanned aerial vehicle.

According to a second aspect, an embodiment of the present invention provides an obstacle avoidance apparatus, used for an unmanned aerial vehicle. The unmanned aerial vehicle includes a camera apparatus. The camera apparatus supports optical zoom. The apparatus includes:

a detection image obtaining module, configured to obtain detection images of at least two different focal lengths from the camera apparatus;

an obstacle determining module, configured to determine, according to the detection images of the at least two different focal lengths, that an obstacle exists in a detection area; and an obstacle position obtaining module, configured to obtain position information of the obstacle according to the detection images of the at least two different focal lengths.

In an embodiment of the present invention, the position information includes a distance S between the obstacle and the unmanned aerial vehicle and a height difference H between the obstacle and the unmanned aerial vehicle; and the obstacle position obtaining module is specifically configured to:

calculate the distance S between the obstacle and the unmanned aerial vehicle and the height difference H between the obstacle and the unmanned aerial vehicle:

$$S = \frac{(f1f2(h2 - h1) + h1h2(f1 - f2)\tan\theta)}{(f2h1 - f1h2)}$$

$$H = \frac{h1h2(f2 - f1)}{(f2h1 - f1h2)\cos\theta}$$

where $\theta$ is an angle between a flight direction of the unmanned aerial vehicle and a horizontal direction, f1 is a distance between an image plane and an optical center when the camera apparatus is at a first focal length, h1 is an imaging height of the obstacle above the center of the image plane when the camera apparatus is at the first focal length, f2 is a distance between the image plane and the optical center when the camera apparatus is at a second focal length and h2 is an imaging height of the obstacle above the center of the image plane when the camera apparatus is at the second focal length, where $0° \leq \theta < 90°$.

In an embodiment of the present invention, the apparatus further includes:

a direction adjustment module, configured to adjust a velocity direction of the unmanned aerial vehicle according to the position information of the obstacle, to avoid the obstacle.

In an embodiment of the present invention, the direction adjustment module is specifically configured to:

adjust the velocity direction of the unmanned aerial vehicle upward by a deflection angle A, the deflection angle A being:

$$A = \arctan\left[\frac{\lambda h1h2(f2 - f1)}{f1f2(h2 - h1)\cos\theta + (f1 - f2)h1h2\sin\theta}\right]$$

where $\lambda$ is a safety factor.

In an embodiment of the present invention, the apparatus further includes:

a camera adjustment module, configured to adjust the camera apparatus to face the detection area.

In an embodiment of the present invention, the camera adjustment module is specifically configured to:

adjust a visual axis of the camera apparatus to be aligned with the flight direction of the unmanned aerial vehicle.

According to a third aspect, an embodiment of the present invention provides an unmanned aerial vehicle, including a vehicle body, an arm connected to the vehicle body, an actuating apparatus disposed on the arm and a camera apparatus configured to obtain an image. The camera apparatus supports optical zoom. The unmanned aerial vehicle further includes:

a processor; and a memory communicably connected to the processor; where the memory stores an instruction executable by the processor and the instruction is executed by the processor, to enable the processor to perform the foregoing method.

In an embodiment of the present invention, the camera apparatus is a main camera of the unmanned aerial vehicle.

According to a fourth aspect, an embodiment of the present invention provides a non-volatile computer readable storage medium. The computer readable storage medium stores a computer executable instruction. When the computer executable instruction is executed by an unmanned aerial vehicle, the unmanned aerial vehicle is enabled to perform the foregoing method.

According to a fifth aspect, an embodiment of the present invention provides a computer program product, including a computer program stored on a non-volatile computer readable storage medium. The computer program includes a program instruction. When the program instruction is executed by an unmanned aerial vehicle, the unmanned aerial vehicle is enabled to perform the foregoing method.

In the embodiments of the present invention, the camera apparatus supporting the optical zoom obtains the detection images of the at least two different focal lengths. Then it is determined, according to the detection images of the at least two different focal lengths, that an obstacle exists in the detection area. Position information of the obstacle is obtained according to the detection images. Because the camera apparatus performs an optical zooming operation quickly, it's no need to precisely obtain position and attitude information of the unmanned aerial vehicle by using a GPS and an onboard inertial device, which avoids measurement interference and a positioning error caused by the inertial device, and improves calculation precision.

BRIEF DESCRIPTION OF THE DRAWINGS

Exemplary descriptions of one or more embodiments are provided with reference to the figures in the accompanying drawings corresponding to the one or more embodiments. These exemplary descriptions do not constitute any limitation on the embodiments. Elements having identical reference numerals in the accompanying drawings represent similar elements. Unless otherwise specified, the figures in the accompanying drawings do not constitute any proportional limitation.

DETAILED DESCRIPTION

To make the objectives, technical solutions and advantages of the embodiments of the present invention more clear, the following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
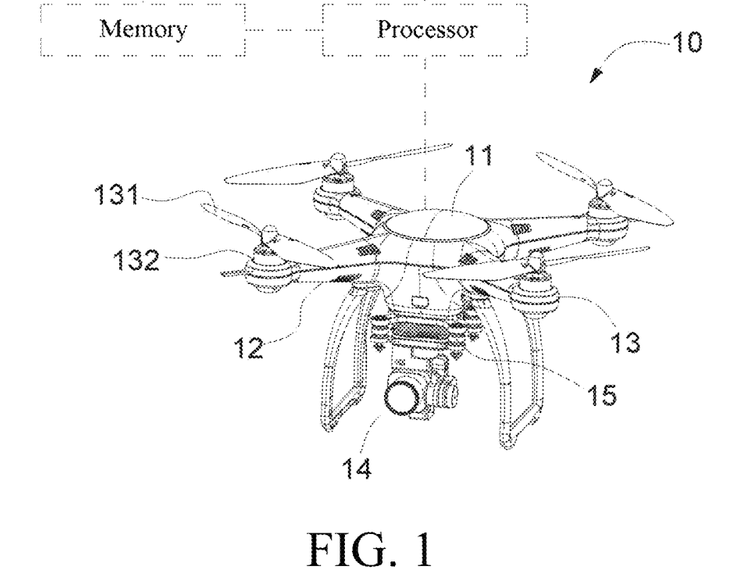
FIG. 1 is a schematic structural diagram of an unmanned aerial vehicle according to an embodiment of the present invention.

FIG. 1 is a schematic structural diagram of an unmanned aerial vehicle 10 according to an embodiment of the present invention. The unmanned aerial vehicle 10 includes a vehicle body 11, arms 12 connected to the vehicle body 11, an actuating apparatus 13 disposed at an end of each arm 12, a gimbal 15 connected to the vehicle body 11, a camera apparatus 14 connected to the gimbal 15, and a processor 16 and a memory 17 that are disposed in the vehicle body 11.

In this embodiment, the number of the arms 12 is four, that is, the aircraft is a quadrotor aircraft. In other possible embodiments, the number of the arms 12 may be three, six, eight, ten or the like. The unmanned aerial vehicle 10 may be other movable objects, such as a manned aircraft, a model airplane, an unmanned airship, a fixed-wing drone and an unmanned hot-air balloon.

The actuating apparatus 13 includes a motor 132 disposed at the end of each arm 12 and a propeller 131 connected to a rotating shaft of the motor 132. The rotating shaft of the motor 132 rotates to drive the propeller 131 to rotate, so as to provide a lifting force to the unmanned aerial vehicle 10.

The gimbal 15 is configured to alleviate or even eliminate vibration transferred by the actuating apparatus 13 to the camera apparatus 14, to ensure that the camera apparatus 14 can capture a stable and clear image or video.

The camera apparatus 14 may be a high definition camera, a motion camera or the like. The camera apparatus 14 is configured to capture an image. In an embodiment of the present invention, the camera apparatus 14 supports autonomous optical zoom. The camera apparatus 14 may be directly mounted on the unmanned aerial vehicle 10 or may be mounted on the unmanned aerial vehicle 10 by using the gimbal 15 shown in this embodiment. The gimbal 15 allows the camera apparatus 14 to rotate about at least one axis relative to the unmanned aerial vehicle 10.

The processor 16 may include a plurality of functional units, such as a flight control unit configured to control a flight attitude of the aircraft, a target identification unit configured to identify a target, a tracking unit configured to track a particular target, a navigation unit (for example, a GPS (Global Positioning System) or Beidou) configured to navigate the aircraft and a data processing unit configured to process environmental information obtained by a related onboard device (for example, the camera apparatus 14).

Figure 2:
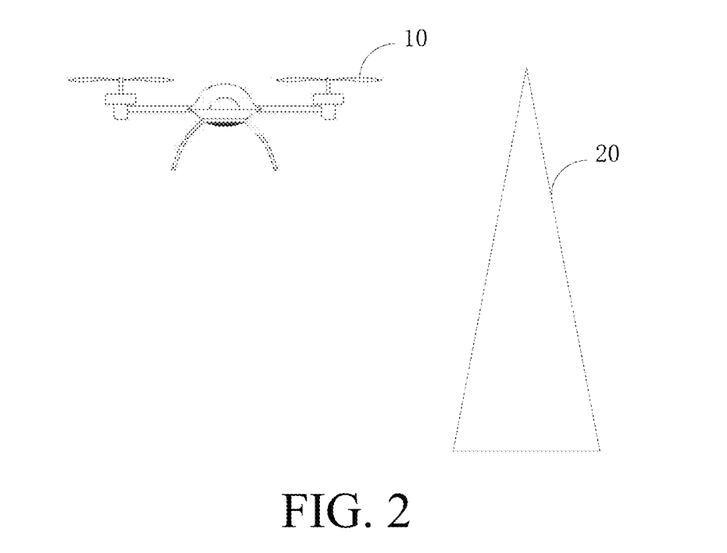
FIG. 2 is a diagram of an application scenario of an obstacle avoidance method and apparatus according to an embodiment of the present invention.

FIG. 2 is a diagram of an application scenario of an obstacle avoidance method and apparatus according to an embodiment of the present invention. The application scenario includes an unmanned aerial vehicle 10 and an obstacle 20 (only one obstacle is shown in FIG. 1. In an actual application, there may be more obstacles or no obstacle.)

During autonomous return or an autonomous flight, the unmanned aerial vehicle 10 needs to identify and avoid the obstacle 20 ahead. The unmanned aerial vehicle 10 determines, by means of visual identification, whether an obstacle exists ahead. The unmanned aerial vehicle 10 captures an image ahead of the flight by using the camera apparatus 14 and determines, by processing the image by using a processor 16, whether an obstacle exists. Specifically, the unmanned aerial vehicle 10 adjusts a camera apparatus 14 to at least two different focal lengths by using the processor 16. For example, the unmanned aerial vehicle 10 adjusts the camera apparatus 14 to a first focal length and a second focal length. Then the unmanned aerial vehicle 10 obtains detection images of different focal lengths, performs image resolving on the detection images and determines that an obstacle exists ahead of the flight. Then the unmanned aerial vehicle 10 obtains position information of the obstacle, to take measures to avoid the obstacle.

Figure 3:
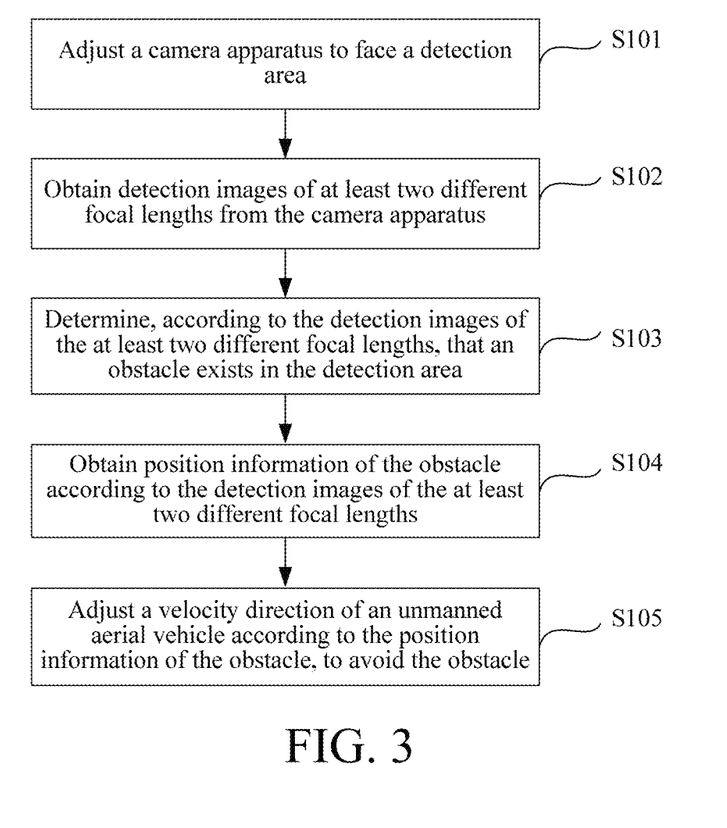
FIG. 3 is a flowchart of an obstacle avoidance method according to an embodiment of the present invention.

FIG. 3 is a flowchart of an obstacle avoidance method according to an embodiment of the present invention. The method may be performed by the unmanned aerial vehicle 10 in FIG. 1 or FIG. 2. As shown in FIG. 3, the method includes:

S101: Adjust the camera apparatus 14 to face a detection area.

The unmanned aerial vehicle 10 adjusts the camera apparatus 14 to face the detection area, to capture an image of the detection area. In other words, the unmanned aerial vehicle 10 adjusts a visual axis of the camera apparatus 14 to be aligned with a flight direction of the unmanned aerial vehicle 10, so that the camera apparatus 14 faces the detection area. The detection area is an area ahead of a flight. In an actual application, when the unmanned aerial vehicle 10 flies to a destination, the unmanned aerial vehicle 10 firstly adjusts itself to a specific height and keeps flying in a horizontal direction. The unmanned aerial vehicle 10 aligns the flight direction with a line connecting a projection of the unmanned aerial vehicle 10 at a current position and the destination. Then the unmanned aerial vehicle 10 fixes a position of the camera apparatus 14, to make a projection of the visual axis of the camera apparatus 14 parallel to the flight direction. That is, the line connecting the projection of the unmanned aerial vehicle 10 at the current position and the destination, the flight direction and the projection of the visual axis are parallel to each other.

S102: Obtain detection images of at least two different focal lengths from the camera apparatus 14.

In this embodiment of the present invention, the camera apparatus 14 supports autonomous optical zoom. Currently, an aerial camera usually captures an image by means of digital zoom. When obtaining a partially enlarged image, the aerial camera may lose image information of the scene. By means of the camera apparatus 14 supporting the autonomous optical zoom adopted in this embodiment of the present invention, the image information of the scene will not be lost. Due to the high quality of imaging of the camera apparatus 14 and the rapidity of an autonomous zooming operation, measurement interference caused by an onboard inertial device can be reduced to a large extent, thereby improving calculation precision.

Optical zoom capabilities of camera apparatuses are different. A larger zoom range of a camera apparatus indicates a larger detection range of the camera apparatus. At least two preset focal lengths may be selected from a zoom range according to an obstacle avoidance distance of the unmanned aerial vehicle 10 in advance, for example, a first preset focal length is 8 mm and a second preset focal length is 20 mm; or a first preset focal length is 10 mm and a second preset focal length is 28 mm. Then the camera apparatus 14 captures images of the detection area at the first preset focal length and the second preset focal length and obtains detection images of the first preset focal length and the second preset focal length. Alternatively, a first preset focal length, a second preset focal length and a third preset focal length may be preset. Then, detection images of the three different focal lengths are obtained.

The detection image may be a complete image captured by the camera apparatus 14, or may be a part of image selected from the complete image. For example, a left or right area near a longitudinal center of the image is selected from the complete image captured by the camera apparatus 14, as a detection image. Because an object within left and right edges of the image captured by the camera apparatus 14 does not hinder the unmanned aerial vehicle 10, when a range of the detection image providing a basis for subsequent calculation is smaller, a calculation speed is faster. The calculation speed is improved when a part of an image is selected as a detection image.

S103: Determine, according to the detection images of the at least two different focal lengths, that an obstacle exists in the detection area.

Specifically, it is determined, according to the detection images of the at least two different focal lengths, that an obstacle exists in the detection area. First, image resolving may be performed on detection images of different preset focal lengths to obtain a disparity map of the detection images. Then recognition is performed on the disparity map to determine whether an obstacle exists in the detection area. If two detection images are obtained in step S102, a disparity map of the two detection images may be obtained. If three detection images are obtained in step S102, a disparity map of every two of the three detection images may be obtained. To obtain a disparity map of detection images of any two different focal lengths, pixel positions of the two detection images corresponding to a same point in space may be found by using a Dense Stereo Matching method, and then a difference between the pixel positions of the two detection images is calculated to obtain the disparity map. The dense stereo matching method may be any of a Sum of Absolute Differences (SAD) algorithm, a Sum of Squared Differences (SSD) algorithm or a Census algorithm.

Figure 4A:
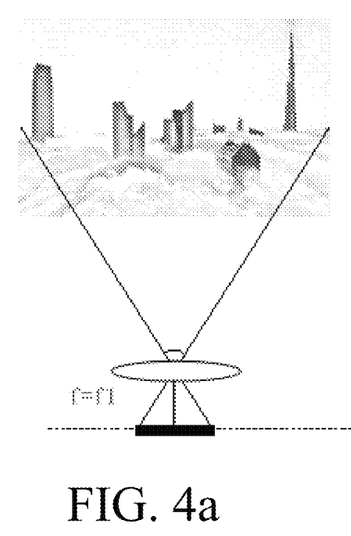
FIG. 4a is a schematic diagram of images captured by a camera apparatus at a focal length f1 according to an embodiment of the present invention.
Figure 4B:
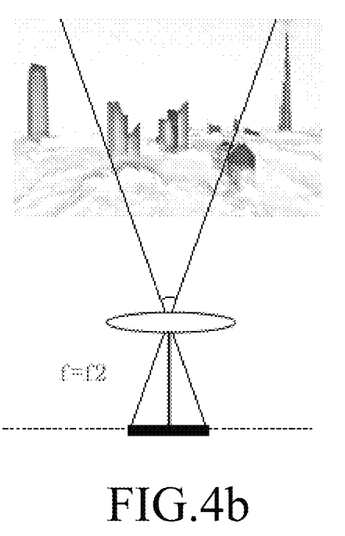
FIG. 4b is a schematic diagram of images captured by the camera apparatus at a focal length f2 according to an embodiment of the present invention.
Figure 5A:
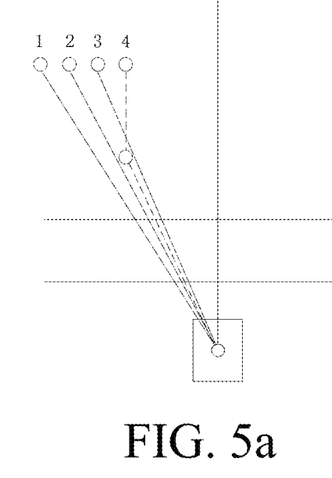
FIG. 5a is a diagram showing imaging positions of objects in images of a focal length according to an embodiment of the present invention.
Figure 5B:
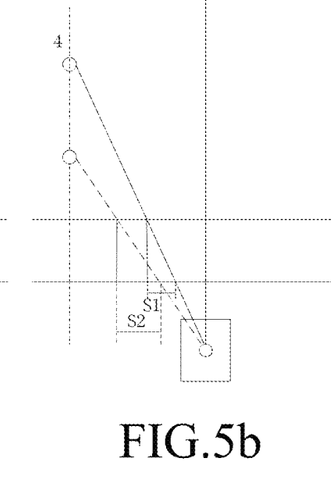
FIG. 5b is a diagram showing imaging positions of one of the objects in images of another focal length according to an embodiment of the present invention.

For a principle of determining, by using a disparity map, whether an obstacle exists in this embodiment of the present invention, refer to FIG. 4 and FIG. 5.

As shown in FIG. 4, the center of an image is fixed. When a focal length is increased, a visual angle is narrowed. If image resolution remains unchanged, positions of a same object in two images before and after zoom are different. As shown in FIG. 5a, for successive objects 1, 2, 3 and 4 with a same depth (the depth may be understood as a distance between the obstacle and the camera apparatus), differences of imaging positions in two image planes at different positions (two transverse lines in FIG. 5 represent image planes at different positions) gradually decrease from left to right. On the contrary, as shown in FIG. 5b, when objects at a same transverse position 4 have a depth difference, a pixel position difference of the objects suddenly increases (S2>S1).

Based on such a rule, when a distance is relatively long, a relatively distant background may be considered as some points with a same depth. A relatively small parallax is presented in a disparity map. When an obstacle exists, a depth difference exists between the obstacle and the relatively distant background. The obstacle presents a relatively large parallax in a disparity map. In this way, whether an obstacle exists can be determined by identifying whether a sudden change of the parallax occurs in the disparity map.

S104: Obtain position information of the obstacle according to the detection images of the at least two different focal lengths.

In an embodiment of the present invention, the position information includes a distance S between the obstacle and the unmanned aerial vehicle 10 and a height difference H between the obstacle and the unmanned aerial vehicle 10. The distance S between the obstacle and the unmanned aerial vehicle and the height difference H between the obstacle and the unmanned aerial vehicle may be obtained by using the following method.

Figure 6:
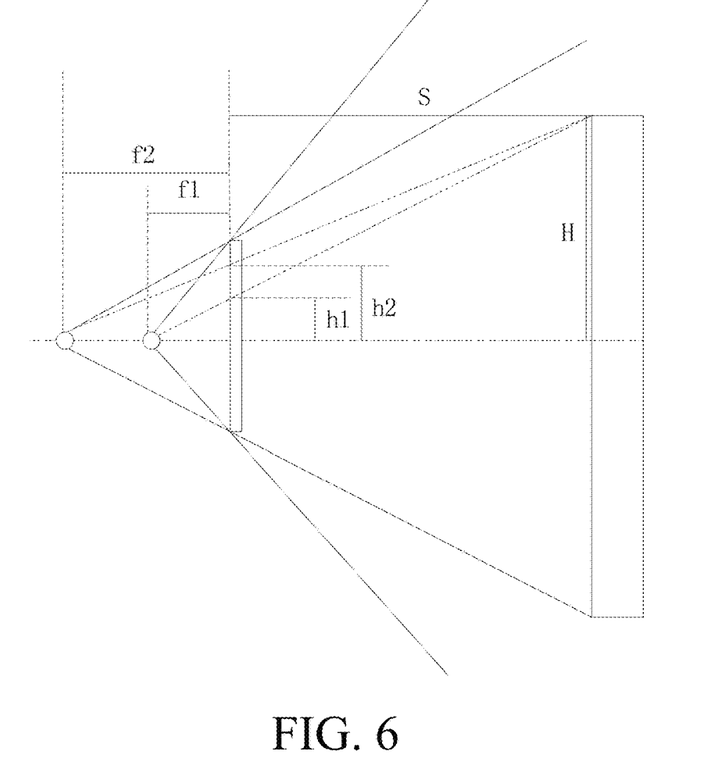
FIG. 6 is a schematic diagram showing imaging of an obstacle at two different focal lengths when a velocity direction of an unmanned aerial vehicle is a horizontal direction according to an embodiment of the present invention.

Referring to FIG. 6, FIG. 6 is a schematic diagram showing imaging of an obstacle at two different focal lengths. A velocity direction of the unmanned aerial vehicle 10 is a horizontal direction. A rectangle on the left represents an image plane. A rectangle on the right represents the obstacle. A transverse dashed line is a center line passing through the center of the image plane. Geometric relationships in FIG. 6 are as follows:

$$\frac{f2}{S+f2} = \frac{h2}{H} \quad (1)$$

$$\frac{f1}{S+f1} = \frac{h1}{H} \quad (2)$$

It can be obtained by solving the formula (1) and the formula (2) that:
the distance S is:

$$S = \frac{f1f2(h2-h1)}{(f2h1-f1h2)} \quad (3)$$

and the height difference is:

$$H = \frac{h1h2(f2-f1)}{(f2h1-f1h2)} \quad (4)$$

where f1 is a distance between the image plane and an optical center when the camera apparatus is at a first focal length, h1 is an imaging height of the obstacle above the center line of the image plane, f2 is a distance between the image plane and the optical center when the camera apparatus is at a second focal length and h2 is an imaging height of the obstacle above the center line of the image plane.

In this embodiment of the present invention, the at least two different focal lengths are set for the camera apparatus. The detection images of the different focal lengths are obtained. Then it is determined, according to the detection images of the different focal lengths, whether an obstacle exists in the detection area. Position information of the obstacle is obtained according to the detection images. Because the camera apparatus performs a zooming operation quickly, it's no need to precisely obtain position and attitude information of an airplane by using a GPS and an onboard inertial device, which avoids measurement interference and a positioning error caused by the inertial device, thereby improves calculation precision.

In addition, in this embodiment of the present invention, whether an obstacle exists is first detected. Then the position information of the obstacle is obtained. The detection efficiency is high.

After obtaining the position information of the obstacle, the unmanned aerial vehicle 10 may directly rise to a specific height and fly at a height higher that the height difference H or horizontally move by a distance to avoid the obstacle.

S105: Adjust a velocity direction of the unmanned aerial vehicle 10 according to the position information of the obstacle, to avoid the obstacle.

Figure 7:
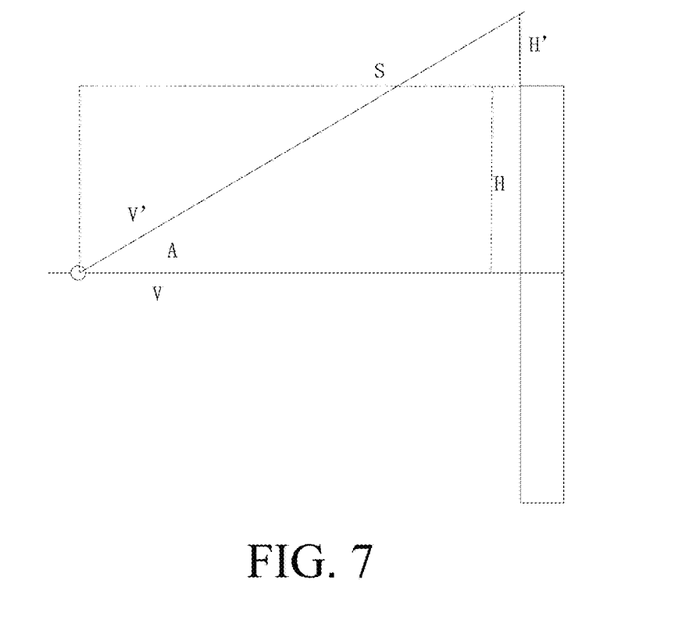
FIG. 7 is a schematic diagram of a velocity direction adjustment scheme when a velocity direction of an unmanned aerial vehicle is a horizontal direction according to an embodiment of the present invention.

In an embodiment of the present invention, the velocity direction of the unmanned aerial vehicle 10 may be adjusted upward by a deflection angle A, so that when the unmanned aerial vehicle 10 reaches a position of the obstacle, a height of the unmanned aerial vehicle 10 is higher than a height of the obstacle. As shown in FIG. 7, if the velocity direction of the unmanned aerial vehicle is adjusted from V to V', a height H' of the unmanned aerial vehicle when the unmanned aerial vehicle reaches the position of the obstacle is greater than a height H of the obstacle. H'=λ×H. λ represents a safety factor. In an embodiment of the present invention, λ=1.1 to 1.3 and a value of λ may be set as needed. The present invention provides the concept of the safety factor to ensure that when the unmanned aerial vehicle 10 adopts a method of flying by orbiting at a high altitude to avoid the obstacle, the unmanned aerial vehicle 10 can certainly avoid the obstacle.

It can be learned from the geometric relationships in FIG. 7 that the deflection angle $$A = \arctan\left(\frac{\lambda \times H}{S}\right).$$

The following can be obtained by substituting $$A = \arctan\left(\frac{\lambda \times H}{S}\right)$$

into the formula (3) and the formula (4):

$$A = \arctan\left[\frac{\lambda h1 h2(f2 - f1)}{f1 f2(h2 - h1)}\right]$$

In an occasion in which the unmanned aerial vehicle 10 is relatively far away from the destination, obstacle detection needs to be continuously performed. That is, in some embodiments of the obstacle avoidance method, the steps in FIG. 3 need to be repeatedly performed at time intervals or distances. If the unmanned aerial vehicle 10 performs the obstacle avoidance operation of adjusting the velocity direction, an angle θ exists between the velocity direction of the unmanned aerial vehicle 10 and the horizontal direction. Alternatively, when the unmanned aerial vehicle 10 executes a special task, an angle exists between the velocity direction of the unmanned aerial vehicle 10 and the horizontal direction.

Figure 8:
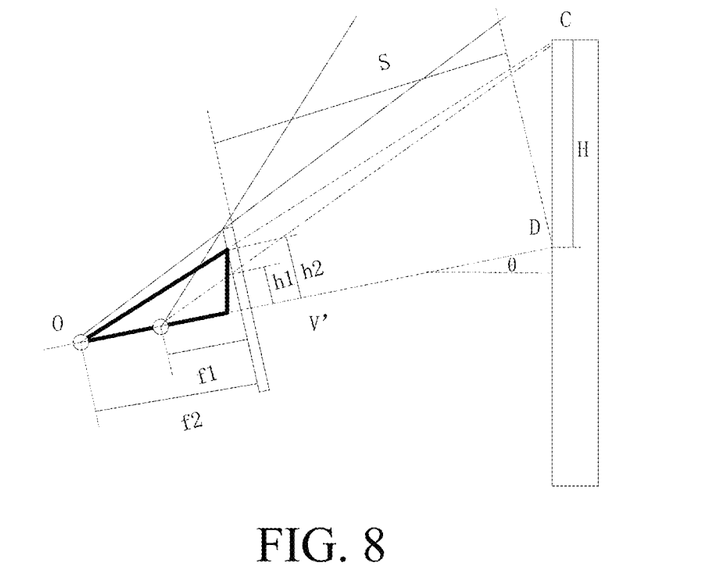
FIG. 8 is a schematic diagram showing imaging of an obstacle at two different focal lengths when an angle exists between a velocity direction of an unmanned aerial vehicle and a horizontal direction according to an embodiment of the present invention.

Referring to FIG. 8, FIG. 8 shows that an angle θ exists between the flight direction V' of the unmanned aerial vehicle 10 and the horizontal direction. It can be learned from geometric relationships in FIG. 8 that a triangle denoted by a bold solid black line and a triangle OCD have a similar relationship. Sides of the two triangles have the following proportional relationships:

$$\frac{f2 - h2\tan\theta}{S + f2} = \frac{h2/\cos\theta}{H} \tag{5}$$

$$\frac{f1 - h1\tan\theta}{S + f1} = \frac{h1/\cos\theta}{H} \tag{6}$$

It can be obtained by solving the formula (5) and the formula (6) that $$S = \frac{(f1 f2(h2 - h1) + h1 h2(f1 - f2)\tan\theta)}{(f2 h1 - f1 h2)} \tag{7}$$

$$H = \frac{h1 h2(f2 - f1)}{(f2 h1 - f1 h2)\cos\theta} \tag{8}$$

Figure 9:
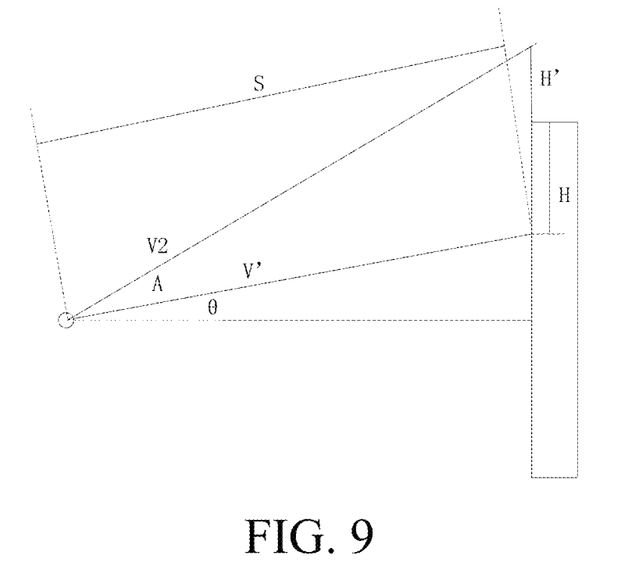
FIG. 9 is a schematic diagram of a velocity direction adjustment scheme when an angle exists between a velocity direction of an unmanned aerial vehicle and a horizontal direction according to an embodiment of the present invention.

Correspondingly, when the angle between the velocity direction of the unmanned aerial vehicle 10 and the horizontal direction is θ, for a velocity direction adjustment scheme, reference may be made to FIG. 9. It can be learned from geometric relationships in FIG. 9 that the deflection angle A is:

$$A = \arctan\left[\frac{\lambda H + S\sin\theta}{S\cos\theta}\right] - \theta$$

$$A = \arctan\left[\frac{\lambda H + S\sin\theta}{S\cos\theta}\right] - \theta$$

The following can be obtained by substituting into the formula (7) and the formula (8):

$$A = \arctan\left[\frac{\lambda h1 h2(f2 - f1)}{f1 f2(h2 - h1)\cos\theta + (f1 - f2)h1 h2\sin\theta}\right]$$

Figure 10:
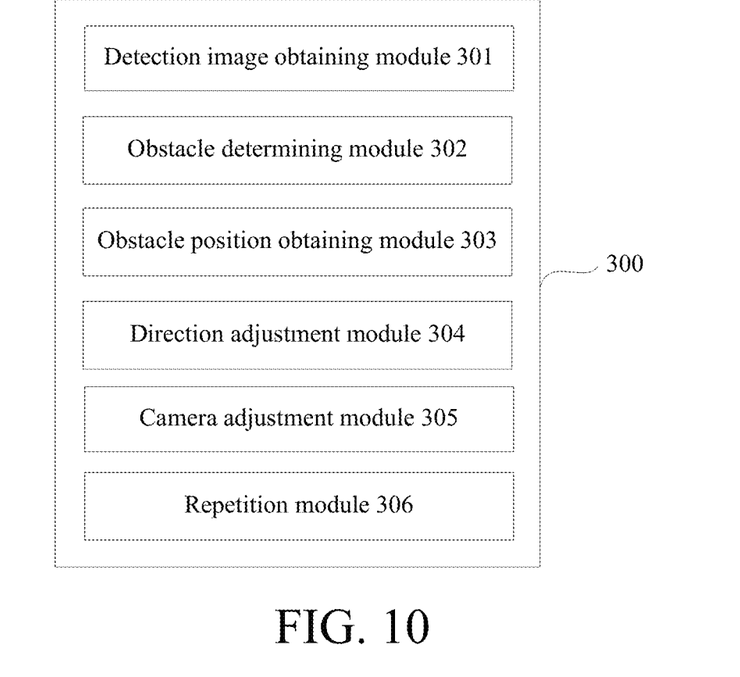
FIG. 10 is a structural block diagram of an obstacle avoidance apparatus according to an embodiment of the present invention.

An embodiment of the present invention further provides an obstacle avoidance apparatus, disposed in the unmanned aerial vehicle 10 shown in FIG. 1. As shown in FIG. 10, the obstacle avoidance apparatus 300 includes:

a detection image obtaining module 301, configured to obtain detection images of at least two different focal lengths from the camera apparatus;

an obstacle determining module 302, configured to determine, according to the detection images of the at least two different focal lengths, that an obstacle exists in a detection area; and an obstacle position obtaining module 303, configured to obtain position information of the obstacle according to the detection images of the at least two different focal lengths.

In this embodiment of the present invention, the at least two different focal lengths are set for the camera apparatus. The detection images of the different focal lengths are obtained. Then it is determined, according to the detection images of the different focal lengths, whether an obstacle exists in the detection area. Position information of the obstacle is obtained according to the detection images. Because the camera apparatus performs a zooming operation quickly, position and attitude information of an airplane do not need to be precisely obtained by using a GPS and an onboard inertial device, avoiding measurement interference and a positioning error caused by the inertial device, thereby improving calculation precision.

In an embodiment of the present invention, the position information includes a distance S between the obstacle and the unmanned aerial vehicle and a height difference H between the obstacle and the unmanned aerial vehicle.

The obstacle position obtaining module 303 is specifically configured to:

calculate the distance S between the obstacle and the unmanned aerial vehicle and the height difference H between the obstacle and the unmanned aerial vehicle:

$$S = \frac{(f1f2(h2-h1) + h1h2(f1-f2)\tan\theta)}{(f2h1 - f1h2)}$$

$$H = \frac{h1h2(f2-f1)}{(f2h1 - f1h-)\cos\theta}$$

where θ is an angle between a flight direction of the unmanned aerial vehicle and a horizontal direction, f1 is a distance between an image plane and an optical center when the camera apparatus is at a first focal length, h1 is an imaging height of the obstacle above the center line of the image plane when the camera apparatus is at the first focal length, f2 is a distance between the image plane and the optical center when the camera apparatus is at a second focal length and h2 is an imaging height of the obstacle above the center line of the image plane when the camera apparatus is at the second focal length, where 0°≤θ<90°.

In an embodiment of the present invention, the obstacle avoidance apparatus 300 further includes:

a direction adjustment module 304, configured to adjust a velocity direction of the unmanned aerial vehicle according to the position information of the obstacle, to avoid the obstacle.

In an embodiment of the present invention, the direction adjustment module 304 is specifically configured to:

adjust the velocity direction of the unmanned aerial vehicle upward by a deflection angle A, the deflection angle A being:

$$A = \arctan\left[\frac{\lambda h1h2(f2-f1)}{f1f2(h2-h1)\cos\theta + (f1-f2)h1h2\sin\theta}\right]$$

where λ is a safety factor.

In an embodiment of the present invention, the obstacle avoidance apparatus 300 further includes:

a camera adjustment module 305, configured to adjust the camera apparatus to face the detection area.

In an embodiment of the present invention, the camera adjustment module 305 is specifically configured to:

adjust a visual axis of the camera apparatus to be aligned with the flight direction of the unmanned aerial vehicle.

In an embodiment of the present invention, the obstacle avoidance apparatus 300 further includes:

a repetition module 306, configured to repeatedly invoke the detection image obtaining module 301, the obstacle determining module 302, the obstacle position obtaining module 303, the direction adjustment module 304 and the camera adjustment module 305 at preset time intervals or preset distances.

It should be noted that the foregoing apparatus may perform the method provided in the embodiments of the present invention and have corresponding function modules for performing the method and corresponding beneficial effects achieved by performing the method. For technical details that are not described in detail in this apparatus embodiments, reference may be made to the method provided in the embodiments of the present invention.

Figure 11:
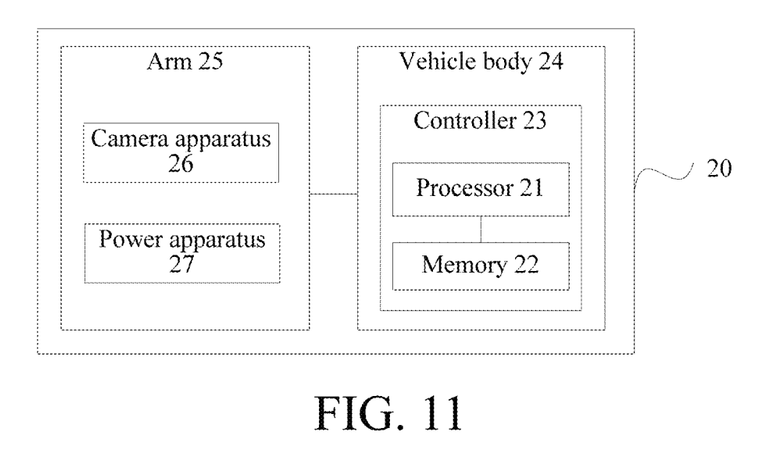
FIG. 11 is a schematic diagram of a hardware structure of an unmanned aerial vehicle according to another embodiment of the present invention.

FIG. 11 is a schematic diagram of a hardware structure of an unmanned aerial vehicle 20 according to an embodiment of the present invention. As shown in FIG. 11, the unmanned aerial vehicle 20 includes: a vehicle body 24, an arm 25 connected to the vehicle body 24, an actuating apparatus 27 disposed on the arm, a camera apparatus 26 configured to obtain an image and a controller 23 disposed in the vehicle body 24. The controller 23 includes at least one processor 21 and a memory 22 disposed inside or outside the unmanned aerial vehicle 20 (for example, in FIG. 11, the memory 22 is disposed inside the unmanned aerial vehicle 20).

The processor 21 and the memory 22 may be connected by using a bus or in another manner.

The memory 22, as a non-volatile computer readable storage medium, may be configured to store a non-volatile software program or a non-volatile computer executable program and module, such as a program instruction/unit corresponding to the obstacle avoidance method in the embodiments of the present invention (for example, the detection image obtaining module 301, the obstacle determining module 302 and the obstacle position obtaining module 303 shown in FIG. 10). The processor 21 executes the non-volatile software program, an instruction and a unit that are stored in the memory 22, to perform various function applications and data processing of the unmanned aerial vehicle 20, that is, implement the obstacle avoidance method in the foregoing method embodiments.

The memory 22 may include a program storage area and a data storage area. The program storage area may store an operating system and an application program required by at least one function. The data storage area may store data created according to use of a user terminal device or the like. In addition, the memory 22 may include a high-speed random access memory, or may include a non-volatile memory, such as at least one magnetic storage device, a flash memory, or another non-volatile solid-state storage device. In some embodiments, optically, the memory 22 includes memories disposed remote to the processor 21, and the remote memories may be connected to the unmanned aerial vehicle 20 by using a network.

The one or more modules are stored in the memory 22. When executed by the one or more processors 21, the one or more modules perform the obstacle avoidance method in any of the foregoing method embodiments, for example, perform step S101 to step S105 in the method described above in FIG. 3, to implement the functions of the modules 301 to 306 in FIG. 10.

The unmanned aerial vehicle 20 may perform the obstacle avoidance method provided in the embodiments of the present invention and have corresponding function modules for performing the method and corresponding beneficial effects achieved by performing the method. For technical details that are not described in detail in this embodiment of the unmanned aerial vehicle 20, reference may be made to the obstacle avoidance method provided in the embodiments of the present invention.

Optionally, in some embodiments of the unmanned aerial vehicle, the camera apparatus 26 adopts a main camera of the unmanned aerial vehicle 20. The main camera may capture three-channel images. When performing stereo matching, three channels need to be aligned to determine a same pixel position. Compared with a current single-channel stereo matching method using gradation information, the three-channel stereo matching method has higher matching precision.

An embodiment of the present invention provides a non-volatile computer readable storage medium. The computer readable storage medium stores a computer executable instruction. The computer executable instruction is executed by one or more processors, to perform, for example, step S101 to step S105 in the method described above in FIG. 3, and to implement the functions of the modules 301 to 306 in FIG. 10.

The apparatus embodiments described above are merely exemplary. The units that are described as separate components may be or may not be physically separated. The components displayed as units may be or may not be physical units, that is, may be located in a same place, or may be scattered on a plurality of network units. Some or all the modules may be selected according to actual needs to achieve the objectives of the solutions of the embodiments.

Based on the foregoing descriptions of the embodiments, a person of ordinary skill in the art may clearly understand that each embodiment may be implemented by software in addition to a general hardware platform or by hardware. A person of ordinary skill in the art should understand that all or a part of the processes of the method in the foregoing embodiments may be implemented by a computer program instructing relevant hardware. The program may be stored in a computer readable storage medium. When the program is run, the processes of the method in the foregoing embodiment are performed. The storage medium may be a magnetic disk, an optical disc, a read-only memory (ROM), a random access memory (RAM), or the like.

Finally, it should be noted that the foregoing embodiments are merely used to describe the technical solutions of the present invention and are not intended to limit the present invention. According to the idea of the present invention, technical features in the foregoing embodiments or different embodiment may be combined. Steps may be implemented in any sequence and there exist many other changes on different aspects of the present invention described above. For brevity, the changes are not provided in detail. Although the present invention is described in detail with reference to the foregoing embodiments, a person of ordinary skill in the art should understand that modifications may be made on the technical solutions recorded in the foregoing embodiments, or equivalent replacements may be made on some of the technical features therein. These modifications or replacements do not cause the essence of the corresponding technical solutions to depart from the scope of the technical solutions of the embodiments of the present invention.

What is claimed is:

1. An obstacle avoidance method, used for an unmanned aerial vehicle, the unmanned aerial vehicle comprising a camera apparatus and the camera apparatus supporting optical zoom, wherein the method comprises:
    obtaining detection images of at least two different focal lengths from the camera apparatus;
    determining according to the detection images of the at least two different focal lengths, that an obstacle exists in a detection area; and
    obtaining position information of the obstacle according to the detection images of the at least two different focal lengths;
    adjusting a velocity and a direction of the unmanned aerial vehicle according to the position information of the obstacle, to avoid the obstacle.

2. The method according to claim 1, wherein the position information comprises a distance S between the obstacle and the unmanned aerial vehicle and a height difference H between the obstacle and the unmanned aerial vehicle; and
    the obtaining position information of the obstacle according to the detection images of the at least two different focal lengths comprises:
    calculating the distance S between the obstacle and the unmanned aerial vehicle and the height difference H between the obstacle and the unmanned aerial vehicle:

$$S = \frac{(f1f2(h2 - h1) + h1h2(f1 - f2)\tan\theta)}{(f2h1 - f1h2)}$$

$$H = \frac{h1h2(f2 - f1)}{(f2h1 - f1h2)\cos\theta}$$

wherein $\theta$ is an angle between a flight direction of the unmanned aerial vehicle and a horizontal direction, f1 is a distance between an image plane and an optical center when the camera apparatus is at a first focal length, h1 is an imaging height of the obstacle above the center line of the image plane when the camera apparatus is at the first focal length, f2 is a distance between the image plane and the optical center when the camera apparatus is at a second focal length and h2 is an imaging height of the obstacle above the center line of the image plane when the camera apparatus is at the second focal length, wherein $0° \leq \theta < 90°$.

3. The method according to claim 1, wherein the adjusting a velocity direction of the unmanned aerial vehicle according to the position information of the obstacle comprises:
    adjusting the velocity direction of the unmanned aerial vehicle upward by a deflection angle A, the deflection angle A being:

$$A = \arctan\left[\frac{\lambda h1h2(f2 - f1)}{f1f2(h2 - h1)\cos\theta + (f1 - f2)h1h2\sin\theta}\right]$$

wherein $\lambda$ is a safety factor.

4. The method according to claim 1, further comprising:
    adjusting the camera apparatus to face the detection area.

5. The method according to claim 4, wherein the adjusting the camera apparatus to face the detection area comprises:

adjusting a visual axis of the camera apparatus to be aligned with the flight direction of the unmanned aerial vehicle.

6. An unmanned aerial vehicle, comprising a vehicle body, arms connected to the vehicle body, a actuating apparatus disposed on each arm and a camera apparatus configured to obtain an image, the camera apparatus supporting optical zoom and the unmanned aerial vehicle further comprising:

a processor; and a memory communicably connected to the processor, wherein the memory stores an instruction executable by the processor and the instruction is executed by the processor, to enable the processor to:

obtain detection images of at least two different focal lengths from the camera apparatus;

determine, according to the detection images of the at least two different focal lengths, that an obstacle exists in a detection area; and obtain position information of the obstacle according to the detection images of the at least two different focal lengths;

adjust a velocity direction of the unmanned aerial vehicle according to the position information of the obstacle, to avoid the obstacle.

7. The unmanned aerial vehicle according to claim 6, wherein the position information comprises a distance S between the obstacle and the unmanned aerial vehicle and a height difference H between the obstacle and the unmanned aerial vehicle; and the processor is configured to:

calculate the distance S between the obstacle and the unmanned aerial vehicle and the height difference H between the obstacle and the unmanned aerial vehicle:

$$S = \frac{(f1f2(h2-h1) + h1h2(f1-f2)\tan\theta)}{(f2h1 - f1h2)}$$

$$H = \frac{h1h2(f2-f1)}{(f2h1 - f1h2)\cos\theta}$$

wherein θ is an angle between a flight direction of the unmanned aerial vehicle and a horizontal direction, f1 is a distance between an image plane and an optical center when the camera apparatus is at a first focal length, h1 is an imaging height of the obstacle above the center line of the image plane when the camera apparatus is at the first focal length, f2 is a distance between the image plane and the optical center when the camera apparatus is at a second focal length and h2 is an imaging height of the obstacle above the center line of the image plane when the camera apparatus is at the second focal length, wherein 0°≤θ<90°.

8. The unmanned aerial vehicle according to claim 6, wherein the processor is configured to: adjusting the velocity direction of the unmanned aerial vehicle upward by a deflection angle A, the deflection angle A being:

$$A = \arctan\left[\frac{\lambda h1h2(f2-f1)}{f1f2(h2-h1)\cos\theta + (f1-f2)h1h2\sin\theta}\right]$$

wherein λ is a safety factor.

9. The unmanned aerial vehicle according to claim 6, wherein the processor is further configured to:

adjust the camera apparatus to face the detection area.

10. The unmanned aerial vehicle according to claim 9, wherein the processor is configured to:

adjust a visual axis of the camera apparatus to be aligned with the flight direction of the unmanned aerial vehicle.

11. The unmanned aerial vehicle according to claim 6, wherein the camera apparatus is a main camera of the unmanned aerial vehicle.

* * * * *